No. 706,752. Patented Aug. 12, 1902.
T. HOLLIDAY.
REVERSING GEAR.
(Application filed July 11, 1901.)
(No Model.)

Witnesses:
Robert W. McCulloch
Eugene A. Rummler

Inventor,
Thomas Holliday
by Harry P. Simonton
his Attorney

UNITED STATES PATENT OFFICE.

THOMAS HOLLIDAY, OF CHICAGO, ILLINOIS.

REVERSING-GEAR.

SPECIFICATION forming part of Letters Patent No. 706,752, dated August 12, 1902.

Application filed July 11, 1901. Serial No. 67,841. (No model.)

*To all whom it may concern:*

Be it known that I, THOMAS HOLLIDAY, a citizen of the United States of America, and a resident of Chicago, in the county of Cook and State of Illinois, have invented certain new and useful Improvements in Reversing-Gears, of which the following is a specification.

My invention relates to reversing mechanism, and is particularly applicable to shafting driven by a gasolene-motor, steam-turbine, or other motor which cannot be easily reversed.

The main object of my invention is to provide an efficient and compact gear suitable for reversing the motion of a rotating shaft without reversing or stopping the motor and to accomplish this result without shock to the mechanism. I accomplish this object by the device shown in the accompanying drawings, in which—

Figure 1:
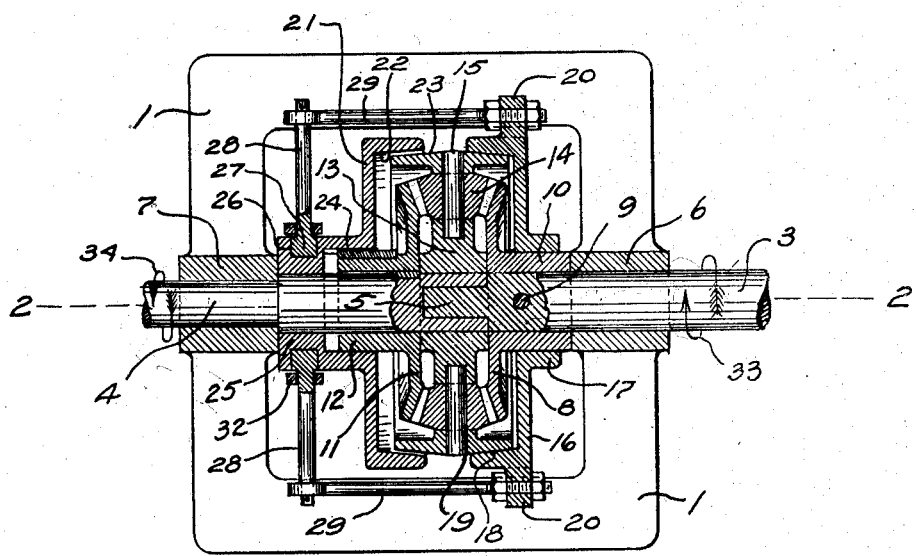
Figure 2:
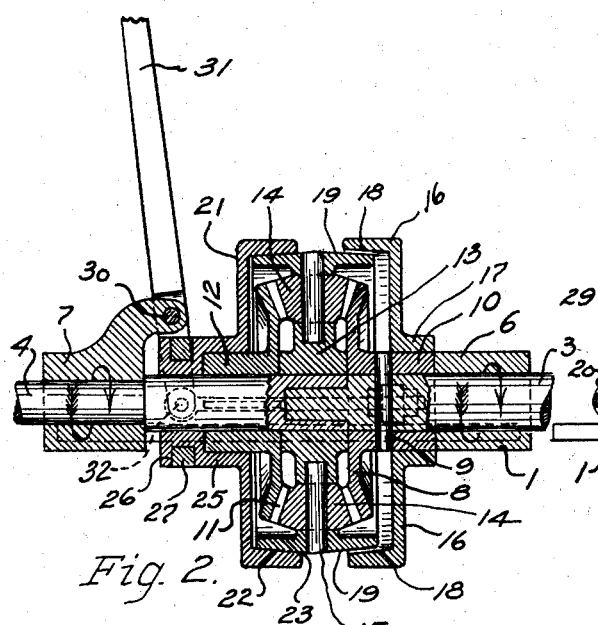
Figure 3:
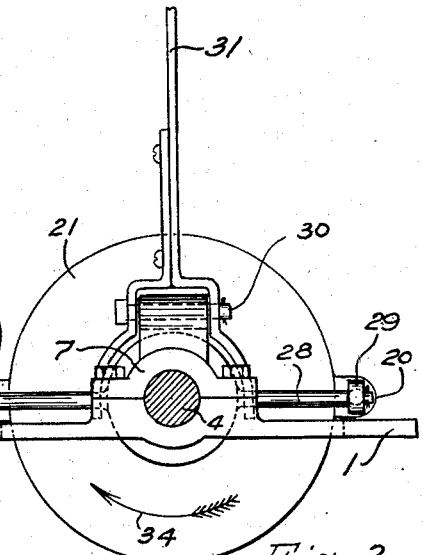

Figure 1 is a horizontal section of a device embodying my invention. Fig. 2 is a longitudinal vertical section on the line 2 2. Fig. 3 is an end elevation.

The device shown consists, primarily, of a frame or bed-plate 1, a driving-shaft 4, journaled at 7 in one end of said frame, and a driven shaft 3, journaled at 6 in the other end and in direct line with the shaft 4. The end of the shaft 4 is counterbored to receive the reduced end 5 of the shaft 3. This counterboring assists in keeping the shafts in perfect alinement. A bevel-gear 8 is rigidly secured near the end of the shaft 3 by the pin 9. The hub of the bevel-gear 9 is extended, as at 10. A bevel-gear 11 is keyed to the end of the shaft 4 and also has an extended hub 12. A wheel 13 is loosely journaled on the shaft 4 between the bevel-gears 8 and 11. Radially journaled within the wheel 13 and in mesh with the bevel-gears 8 and 11 are the bevel-gears 14. The rim 15 of the wheel 13 has its outer face crowned, preferably, in the form of the frusta of two cones placed base to base. A flange 16, having the hub 17 loosely journaled on the extended hub of the bevel-gear 10, is provided with an inner conical face 18, concentric with the center line of the shafts. The angle of inclination of the conical face 18 is equal to that of the conical face 19 of the rim 15. The flange 16 has projecting from its sides the lugs 20. These lugs are adapted to rest on the frame 1 and prevent rotation of the flange 16. The projecting portion of the hub 17 is somewhat shorter than the hub 10 of the flange and is adapted to permit the longitudinal shifting of the flange 16. A flange 21, similar to the flange 16 and having the conical inner surface 22, adapted to coact with the conical outer surface 23 of the wheel 13, is seated on the shaft 4 and splined at 24 to the extended hub 12 of the bevel-gear 11, so as to be revoluble therewith, but free to be moved longitudinally of said shaft. The hub 25 of the flange 21 is extended and has an annular groove 26 in its outer surface. A split collar 27 is loosely seated in the groove 26 and has the transversely-extending arms 28, rigidly connected therewith. The rods 29 connect the arms 28 with the lugs 20 of the flange 16, thus securing a constant longitudinal distance between the flanges 16 and 21. At 30 a forked lever 31 is pivoted to the frame 1. The lower ends 32 of the forked lever are pivoted on the arms 28. It will be seen that this lever is adapted to control both the flanges 16 and 21. The flange 16, coacting with the surface 19 of the wheel 13, forms a friction-clutch adapted to stop the rotation of the wheel 13. Similarly the flange 21 has a friction-clutch adapted to cause the wheel 13 to revolve with the shaft 4. It is preferable to have the angle of inclination of the conical surfaces 18, 19, 22, and 23 very slight, so that the clutches will be self-locking.

The operation of my device is as follows: Consider that the motor turns the driving-shaft 4 constantly in the direction of the arrow 34. Assume first that it is desired that the driven shaft 3 shall turn in the same direction as the driving-shaft 4. The lever 31 is moved to the position shown in Fig. 2—that is, the handle is thrown to the left. The ends 32 of the forked lever act upon the sleeve 26 and force the flange 21 to the right and cause the surfaces 22 and 23 to come into frictional contact with each other. The flange 21 and the bevel-gear 11 being splined together are rigidly secured against independent rotation, and the wheel 13 being held by its frictional contact with the clutch 21 the bevel-gears 14 are firmly secured against rotation, and therefore form a rigid connection between the bevel-gears 8 and 11 and cause the shafts 3 and 4 to revolve as one. To cause the shaft 3 to revolve in a direction opposite to that of the shaft 4, the lever 31 is thrown to the right of the position shown in Fig. 2 until the parts come into the positions shown in Fig. 1—that is, the flange 21 is released from the wheel 13 and the flange 16 is forced into frictional contact with the wheel 13. The lugs 20 on the flange 16 rest on the frame 1, thereby locking the wheel 13 against rotation. The bevel-gear 11 will cause the bevel-gears 14 to revolve, driving the gear 8, and therefore revolving the shaft 3 in the direction of the arrow 33—that is, opposite to the direction in which the shaft 4 is revolving. It will be noticed that the gears are always in mesh, thus avoiding the risk of breaking the teeth, as is the case where reversing is accomplished by throwing in a train of gears. In case it is desired to entirely disconnect the shafts 3 and 4 it is simply necessary to move the lever 31 to an intermediate position, thus freeing both clutches from the wheel 13. This feature is particularly valuable where the device is applied to shafting of launches and auxiliary power in sailing vessels, as it will permit the disconnection of the shafting and allow the propeller to turn freely, thereby reducing its resistance and avoiding any danger to the machinery on account of the propeller striking obstructions.

It will be seen that the arrangements of the parts and the details of construction may be altered in many respects without departing from the spirit of my invention. I therefore do not confine myself to such details except as hereinafter limited in the claim.

What I claim as my invention, and desire to secure by Letters Patent, is—

In a reversing-gear, the combination of a frame; a driving-shaft journaled in said frame; a driven shaft journaled in said frame in line with said driving-shaft; a gear rigidly secured to said driving-shaft; a second gear rigidly secured to said driven shaft; a wheel loosely journaled on one of said shafts and between said gears, the outer face of its rim being substantially the frusta of two cones placed base to base; a gear journaled within said wheel and in mesh with the gears on said shafts; a flange having an inner conical face concentric with the shafts, adapted to fit the adjacent part of the face of said wheel, said flange having thereon a lug engaging said frame whereby said flange is secured against rotation but slidable longitudinally of said shafts; a second flange having an inner conical face concentric with the shafts, adapted to fit the adjacent part of the face of said wheel, and secured to the other shaft so as to be longitudinally slidable thereon and revoluble therewith; suitable connection between said flanges for maintaining a constant distance between same; and means for controlling the position of said flanges longitudinally of said shaft.

Signed at Chicago this 29th day of May, 1901.

THOMAS HOLLIDAY.

Witnesses:
H. P. SIMONTON,
A. R. SEXTON.